US009551376B2

United States Patent
Pabst et al.

(10) Patent No.: US 9,551,376 B2
(45) Date of Patent: Jan. 24, 2017

(54) BEARING CONFIGURATION WITH TWO-ROW POLYGONAL BEARING

(71) Applicant: Schaeffler Technologies GmbH & Co. KG, Herzogenaurach (DE)

(72) Inventors: Alexander Pabst, Eckental (DE); Frank Schoenstein, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 63 days.

(21) Appl. No.: 14/338,810

(22) Filed: Jul. 23, 2014

(65) Prior Publication Data

US 2015/0043859 A1    Feb. 12, 2015

(30) Foreign Application Priority Data

Aug. 12, 2013   (DE) ................. 10 2013 215 892

(51) Int. Cl.
| | |
|---|---|
| F16C 23/08 | (2006.01) |
| F16C 25/08 | (2006.01) |
| F16C 19/54 | (2006.01) |
| F16C 43/04 | (2006.01) |
| F16C 43/06 | (2006.01) |
| F16C 35/067 | (2006.01) |

(Continued)

(52) U.S. Cl.
CPC ............. *F16C 25/08* (2013.01); *F16C 19/466* (2013.01); *F16C 19/54* (2013.01); *F16C 33/588* (2013.01); *F16C 35/067* (2013.01); *F16C 43/04* (2013.01); *F16C 43/065* (2013.01); *Y10T 29/4968* (2015.01)

(58) Field of Classification Search
CPC ......... F16C 25/08; F16C 19/466; F16C 19/54; F16C 33/588; F16C 35/067
See application file for complete search history.

(56) References Cited

U.S. PATENT DOCUMENTS

| | | |
|---|---|---|
| 3,307,891 A | 3/1967 | Carullo |
| 4,976,551 A | 12/1990 | Scharting et al. |
| 5,567,060 A | 10/1996 | Steinberger et al. |

(Continued)

FOREIGN PATENT DOCUMENTS

| | | |
|---|---|---|
| DE | 4134369 A1 | 4/1992 |
| DE | 19825370 A1 | 12/1999 |

(Continued)

*Primary Examiner* — Thomas R. Hannon
(74) *Attorney, Agent, or Firm* — Simpson & Simpson, PLLC (57) ABSTRACT

A bearing configuration for the purpose of mounting a shaft or axle in a housing in a manner allowing rotation. The bearing configuration has a rolling bearing designed as a roller bearing with at least one bearing ring which is functionally assigned to the housing, said bearing ring forming an outer race facing inward radially, wherein rolling elements are guided on said outer race, working together on the opposite side with a shaft which forms an inner race. The roller bearing of the bearing configuration is a combination of at least two joined polygonal bearings, wherein each polygonal bearing on the bearing ring includes at least one elastic segment which forms a convex, transversely rounded race curvature. This configuration ensures that at least one rolling element is radially pretensioned and supported on the outer race of the shaft, and the shaft is guided in the housing with no radial play.

10 Claims, 5 Drawing Sheets

(51) Int. Cl.
  *F16C 19/46*  (2006.01)
  *F16C 33/58*  (2006.01)

(56) References Cited

U.S. PATENT DOCUMENTS

| | | | |
|---|---|---|---|
| 9,360,049 B2 * | 6/2016 | Pabst | .................... F16C 35/067 |
| 2013/0087412 A1 | 4/2013 | Carter et al. | |
| 2015/0043860 A1 | 2/2015 | Pabst et al. | |
| 2015/0055908 A1 | 2/2015 | Pabst et al. | |

FOREIGN PATENT DOCUMENTS

| | | |
|---|---|---|
| DE | 60022715 I2 | 4/2006 |
| DE | 60209752 T2 | 11/2006 |
| DE | 102012222279 A1 | 10/2013 |
| FR | 2789458 A1 | 8/2000 |

* cited by examiner

BEARING CONFIGURATION WITH TWO-ROW POLYGONAL BEARING

CROSS-REFERENCE TO RELATED APPLICATIONS

The present disclosure is filed under 35 U.S.C. §119(a) and claims priority to German Patent Application No. DE102013215892.0, filed Aug. 12, 2013, which application is hereby incorporated by reference in its entirety.

FIELD

The present disclosure relates to a bearing configuration for the purpose of mounting a shaft in a housing in a manner allowing rotation and to a method for the production and for the installation of a roller bearing in the bearing configuration.

BACKGROUND

Roller bearings are rolling bearings with rollers as the rolling elements. These rolling bearings have an inner and an outer race, with rolling elements arranged one after the other along the periphery, about an axis of rotation, between said races. The races are optionally designed on bearing rings or on the surface of the stationary component and the component mounted thereon. Cylindrical rollers or needles can be used as the rolling elements for the roller bearing, and can be designed with a slightly convex outer surface instead of an external cylindrical shape. The end faces are preferably flat, or alternatively have a convex and/or concave curvature. Needles are roller-like rolling elements wherein the ratio of the length thereof to the nominal diameter of the outer surface is greater than or equal to 2. The rolling elements are preferably inserted into a cage which guides the rolling elements along the periphery.

As a result of manufacturing tolerances and in consideration of ease of assembly, radial bearings typically have radial play. The play is introduced into the bearings in an annular gap between the rolling elements and/or the rollers and the races which are functionally assigned to the same. The radial spacing between the races positioned opposite each other is the sum of the diameter of the rollers and the radial play. The rollers can move radially inside this range of play, between the races, which can lead to a disadvantageous noise development. In addition, disadvantages may arise in bearing configurations of rolling bearings having radial bearings, for example, where the converter neck of a torque converter is mounted with an offset of the converter neck with respect to the component functionally assigned to the same, which leads to a radial deflection and an associated uneven load on the bearing configuration and/or the rolling bearing. This is associated with a disadvantageous noise development.

DE 41 34 369 A1 shows a motor vehicle transmission having a hydrodynamic torque converter, wherein an input gear shaft is connected in a non-rotatable manner to the turbine of the torque converter. An extension of the pump wheel of the torque converter with a cylindrical design forms the converter neck. The pump can be connected to a primary pump if necessary, wherein the transmission can be supplied with pressure medium, and the torque converter with oil, via said primary pump. The pump is rotatably mounted on a bearing via the converter neck, by means of a rolling bearing designed as a roller bearing. Due to offset or tilting of the axis of rotation in the arrangement, undesirable, and particularly uneven loads on the bearing configurations and/or the rolling bearings may occur, with an associated disadvantageous noise development.

A rolling bearing designed as a roller bearing is known from FR 27 89458 A1, for the purpose of mounting a steering column. As a way of making it possible to compensate play in the assembled bearing configuration, the roller bearing has an outer bearing ring which is bounded peripherally on both sides by end segments which are connected locally to a central, peripheral segment via mounting links. The segment which forms an inner race for the rolling elements is guided on the opposite side on the shaft and/or the steering column. In addition, the central, peripheral segment has a curved rolling element race which narrows in each of the mounting link positions, for the purpose of influencing the play in the bearing configuration, thereby elastically pretensioning the assembled rolling elements of the roller bearing.

The problem addressed by the example embodiments described herein is that of providing a noise-optimized roller bearing having no peripheral variation in rigidity, and with reduced bearing play.

BRIEF SUMMARY

The bearing configuration includes a roller bearing which consists of at least two polygonal bearings joined together to make a structural unit. Each polygonal bearing designed as a rolling bearing in this case includes a bearing ring with race curvatures which form elastic segments having transversely convex profiles, wherein the race curvatures are arranged in a polygonal shape. The convex segment of the race curvature, oriented in the direction of the axis of rotation of the roller bearing, advantageously and decisively improves the elasticity of the race. Due to the elastic design of the segments which work together with rolling elements, a geometry which is other than cylindrical results. The segment is elastically and radially pretensioned via the race curvature against at least one roller of a series of roller bearings, and preferably against two, three, or even more of the rolling elements designed as rollers. As a result of the fact that the segment of the jacket is radially pretensioned against the roller(s), the same are radially supported on the outer race of a shaft or of an inner bearing ring, facing radially inward. The race curvatures, which are preferably oriented on the outer bearing ring in the direction of the axis of rotation of the bearing configuration, advantageously improve the elasticity of a race.

The outer race of the rolling elements can be constructed directly on the surface segment of a shaft, or on an inner bearing ring. The inner race is either designed in a housing or in an outer bearing ring which is fitted into the housing. The example embodiments are not limited to a bearing configuration which includes two polygonal bearings. Depending on needs—for example, for greater radial forces or working loads, three or more polygonal bearings can be joined together. As a result of the race curvatures of the two polygonal bearings, arranged in a polygonal shape, a desirably high elasticity exists in the load points, which can also be termed 'troughs'. In the load release points—the crests—of the races, there is a relatively high rigidity of the bearing ring or the bearing jacket. As a result, there is an advantageous lesser or greater compression or rigidity according to the peripheral- or angular position of the rotating load. Due to the two polygonal bearings which each form a roller bearing, and which together form a bearing configuration, there can advantageously be no severe peripheral variation of rigidity when a radial load is applied.

A further advantage of the arrangement is that it is possible to compensate an axle offset and radial deflection in the bearing configuration due to the manufacturing process, by way of example, by the elastic segments which have a transversely convex profile, by the rollers or needles being cushioned on the inner race. If the shaft rotates with respect to the housing, the rolling elements of the roller bearing roll on the races, and during the process pass the elastic segments which form the narrow points and eliminate the play in the bearing, one after another, wherein these elastic segments project with respect to the other segments or regions of the bearing ring.

In addition, with the example embodiments described herein, it is possible to realize a low-noise bearing because the joined polygonal bearings having segments which are offset with respect to each other, create a bearing configuration with limited elasticity which is essentially closed peripherally, for a rotating shaft, by way of example. The radial pretensioning of the rolling elements designed as rollers or needles results in a desirable removal of the radial play which leads to an advantageous noise suppression. The use of the bearing configuration in a gearing advantageously enables a compensation of an uneven load on the bearing configuration and/or the rolling bearing. Such disadvantageous loads particularly occur in the case of axle offset or radial deflection which results in a deviation from the axially parallel ideal position of the axis of rotation or the axes of symmetry of the components which work together.

In one advantageous example embodiment, each polygonal bearing of the bearing configuration includes a bearing ring which includes—in addition to race curvatures with transversely convex profiles which form elastic segments— further radially elastic segments which are oriented along the periphery and which form a longitudinal convexity. In this way, it is possible to further increase the elasticity of the bearing ring, and consequently of the roller bearing. As a result of the race curvatures of the elastic segments which intentionally compress elastically when a radial load is applied, said race curvatures having transverse and/or longitudinal convexities, it is possible to realize a roller bearing constructed as a multi-row polygonal bearing which is free of play and optimized for sound. The elasticity, and consequently the compression, can be advantageously tuned to the radial load as a result of a corresponding constructive design and/or shaping of the elastic segments, the same having a polygonal design.

According to a further example embodiment, the elastically designed segments are configured on congruent or different zones of the bearing rings of the polygonal bearings which work together. In addition, there is a positionally-correct, angularly offset orientation of the bearing rings of the polygonal bearings, which together form a structural unit constructed as a roller bearing. For this purpose, the outer bearing rings are preferably joined with their positions fixed. As a result of this measure, the phases of more intense compressions can be decisively increased, due to the lesser compression rigidity which results from the increased number of elastic segments around the periphery, which indirectly contributes to a desired noise reduction. For polygonal bearings with a preferably triangular design of the polygonal shape, it can be contemplated that the outer bearing rings of the polygonal bearing are fixed with an angular offset of 60° with respect to each other, in such a manner that there is an angular offset of 60° between the load points, termed 'troughs', and the load release points—the crests—alternating between the polygonal bearings, distributed around the periphery.

In addition, each outer bearing ring of the polygonal bearings includes a fixed skirt, and a flanged skirt on the opposite side, via which the cage which receives the rolling elements is guided axially. The outer bearing rings of the polygonal bearings are preferably fixed by means of a positive-fitting retainer, to achieve a precise angularly offset arrangement of said polygonal bearings. For this purpose, the skirt of one bearing ring includes a notch into which an axial extension on the skirt of the other associated bearing ring engages in a positive-fitting manner. In addition, each polygonal bearing has a profiling in the shape of a crown on at least one bearing ring skirt on the side which faces radially inward. Due to the, by way of example, semicircular profiling designed as an open punched hole, it is possible to achieve greater lubricant throughput for the roller bearing, which improves the lubrication and cooling. The profiling can also be used to identify and/or to improve a positional orientation, as well as a positive-fitting accommodation in an automated assembly process, thereby constituting protection against improper assembly.

In addition, the outer contour of the bearing rings has a conicity, wherein an outer diameter $D_2$ assigned to the flanged skirt is greater than an outer diameter $D_1$ on the fixed skirt. In this case, a jacket trace—a maximum circumscribed circle—occurs at each of these outer diameters of the bearing ring. Between the jacket traces, the bearing ring defines a maximum inscribed circle.

There is roundness deviation for the race curvature prior to assembly ≥0.2 mm, and after assembly ≥0.025 mm. So that this measurement range can be realized, a tolerance range of 0.2 to 0.35 mm is allowed in the production of the bearing ring and/or the jacket prior to assembly, and 0.025 to 0.045 mm following assembly. The roundness defines the radial distance of the extreme points of the included circumference line as a reference circle.

In addition, there are defined values for a straightness of the race. These are ≥0.015 mm, and preferably 0.015 to 0.04 mm for the transversely convex race curvature of the bearing ring prior to assembly. When the same is inserted, a value ≥0.01 mm, and preferably 0.01 to 0.02 mm is allowed for the load release point (A) of a crest zone, and a value ≥0.02 mm, and preferably 0.02 to 0.04 mm is set for the load point (B)—a trough zone.

As a further intervention to optimize the elasticity, it can be contemplated that there is a reduced wall thickness compared to the other bearing ring segments in the elastic segments of the bearing ring which include a race curvature. The example embodiments preferably provide a ratio ≥10 between the diameter of the inner race and the radial wall thickness of the bearing ring. Steel sheet metal is particularly suitable as the material for the bearing ring designed. For the purpose of enlarging a contact surface which contacts the rolling elements, the elastic, transversely convex segment preferably has a central, flattened zone in the region of an apex and/or inflection point of the race curvature. This measure simultaneously leads to a desired, reduced contact pressure between each of the elastic segments and the rolling elements.

A roller bearing can preferably be used for a transmission having a torque converter, by a pump wheel of the torque converter connected to a converter neck being mounted in a housing by means of the bearing configuration in a manner allowing rotation. An offset which could potentially occur in this case compared to an ideal alignment—for example, between the axis of rotation of the converter neck and the axis of symmetry of the housing bore hole, can be largely compensated. As such, it is advantageous that a disadvantageous wobble in the rotating components is prevented, which has positive effects on the wear behavior and the noise development. In addition to further possible applications, the bearing configuration can be advantageously used as a steering mount for a vehicle. The compensation of play which can be effectively achieved decisively improves the ease of steering of the vehicle.

A method including the following steps is provided for the production of a roller bearing for a bearing configuration. Initially, the production of the bearing rings which are preferably designed as jackets, said bearing rings having a fixed skirt, is carried out by means of molding a metal strip, particularly by means of a drawing process. Next, the bearing rings are flanged, including the creation of a flanged skirt and a profiling of an inward-facing side of at least one skirt. Next, a notch is introduced in one skirt of a bearing ring, an axially-projecting extension is molded onto a skirt of the other associated bearing ring, and punch-outs are made peripherally on the inner side of the skirt. The insertion of the jacket into a die for the purpose of forming a polygonal shape is a further step. The tool—the die—is designed in such a manner that following the molding process, the bearing ring has both a defined roundness deviation and a convex race curvature in the polygonal segments. Next, a heat treatment of the bearing ring designed as a jacket is carried out, which improves the resistance to abrasion. Next, the roller bearing is completed by components being inserted into the jacket, such as a slotted cage and the rolling elements designed as rollers or needles, to produce the polygonal bearing. To create a bearing configuration, the roller bearing constructed as a two-row polygonal bearing is press fitted into a receiving bore of a housing, wherein the bearing rings of the polygonal bearings are fixed in position with an angular offset with respect to each other by means of a positive-fitting retainer.

BRIEF DESCRIPTION OF THE DRAWINGS

Additional features are found in the following description of the figures illustrating example embodiments, wherein the example embodiments are not restricted to these embodiments. In the figures, FIG. 1 schematically illustrates the principle of a polygonal bearing;

FIG. 2 shows a cross-sectional view of a roller bearing designed as a polygonal bearing, of a bearing configuration;

DETAILED DESCRIPTION

Figures 1, 2:
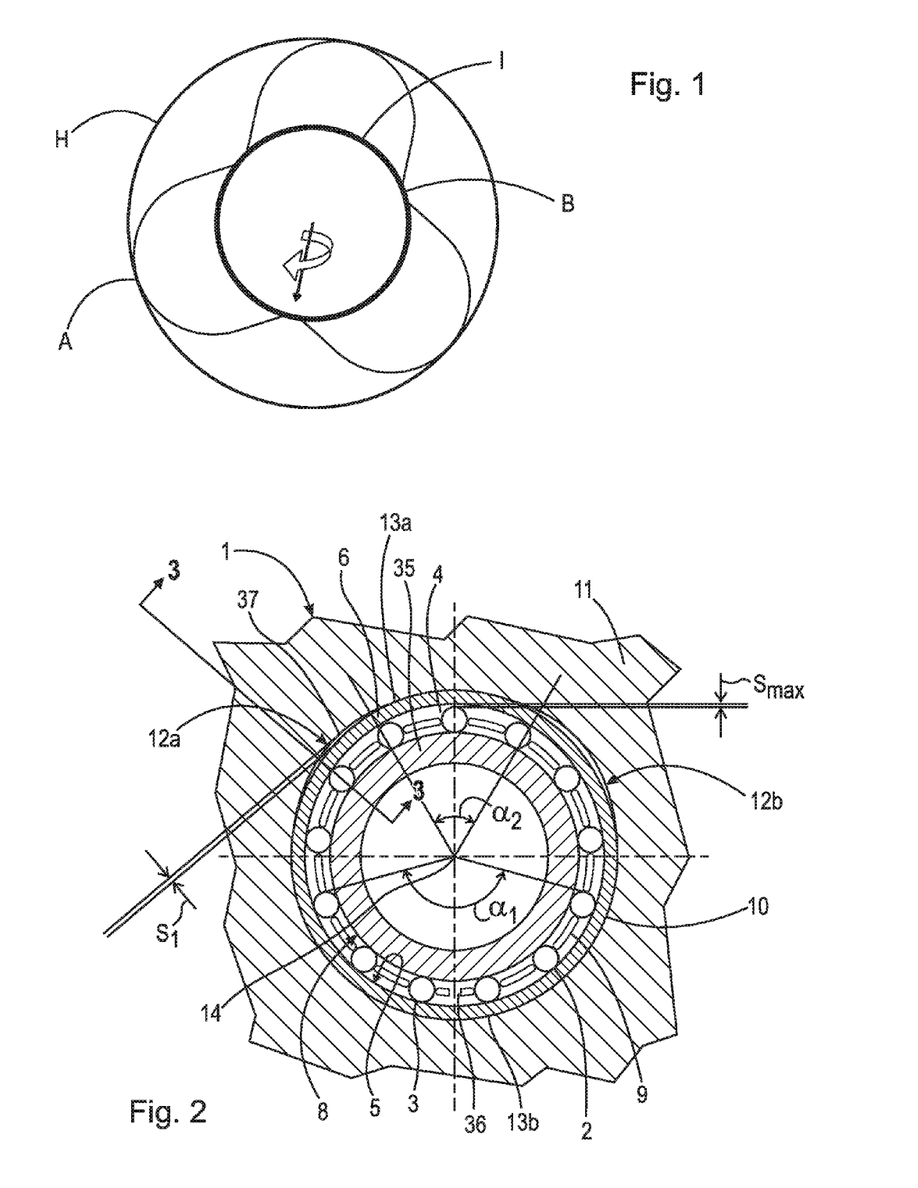

FIG. 1 clarifies the features of roller bearing 2 designed as a polygonal bearing according to FIG. 2, having a polygonal shape with a triangular design. The polygonal shape forms three load release points indicated by the letter A, each of which is offset by an angle of 120°. These can also be termed 'crest zones'. The polygonal shape also forms three load points and/or trough zones which are indicated by the letter B. The polygonal shape is enclosed by a shell circle H. An inner circle I corresponds to a maximum, inner circle of the polygonal shape, which can also be termed a 'maximum inscribed circle'. The inner arrow shows the rotating radial load of the polygonal bearing, which undergoes an uneven compression peripherally due to hard and soft regions or zones of the polygonal bearing.

FIG. 2 shows bearing configuration 1 in a cutaway view, having roller bearing 2 designed as a polygonal bearing. As can be seen in this illustration, rolling elements 3 designed as rollers are arranged peripherally adjacent to each other in annular gap 4, radially between inner race 5 of bearing ring 6 and outer race 8 on central shaft or inner bearing ring 35. In this case, rolling elements 3 are guided in cage 9 having slot 36, spaced from each other as evenly as possible around the periphery. Roller bearing 2 is inserted into bore hole 10 of housing 11 via bearing ring 6, in a positive-fitting manner, for example, by means of a press fit. Bearing configuration 1 has two radially elastic segments 12a, 12b running around the periphery, angularly offset with respect to each other, and forming a longitudinal convexity, which are convexly curved as seen from axis of rotation 14. A polygonal shape results from these elastic segments 12a, 12b for inner race 5. Elastic segments 12a, 12b narrow annular gap 4, thereby radially pretensioning, and supporting with no play rolling elements 3 on inner race 5 at least in these regions. On the opposite side, in the region of segments 12a, 12b, radial play $S_1$ exists between a cylindrical outer contour of bearing ring 6 and bore hole 10 of housing 11. Inner race 5 comprises elastic segments 12a, 12b, as well as two adjacent regions 13a, 13b, via which bearing ring 6 is fitted into bore hole 10 of housing 11 by the side which faces away from inner race 5. Regions 13a, 13b are delineated by a shared radius proceeding from axis of rotation 14, wherein the length thereof corresponds to the radian measure of a circular arc which in each case is described by angle $\alpha_1$ or $\alpha_2$. In region 13a, a zone of roller bearing 2 with low radial load, a maximum radial play $S_{max}$ is reached between inner race 5 and rolling elements 3.

Figure 3:
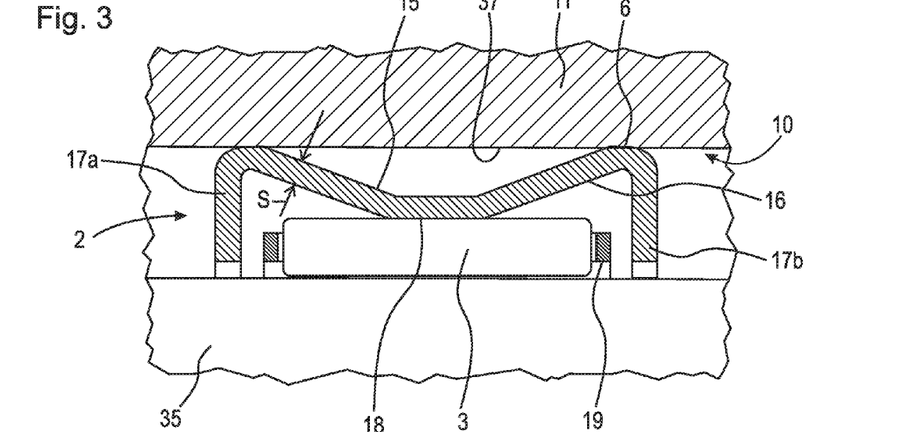
FIG. 3 shows a detailed cutaway along line 3-3 of the roller bearing in FIG. 2.

FIG. 3 shows a radially pretensioned assembled state of roller bearing 2 in FIG. 2, in an enlarged detail cutaway along line 3-3. Bearing ring 6 designed as a jacket has elastic segment 15 oriented in the longitudinal direction of shaft 35 and forming transversely convex race curvature 16. Segment 15 is preferably placed in a coincident zone of bearing ring 6 together with segment 12a. Deviating from this configuration, the example embodiment also includes an angular offset between elastic segments 12a, 12b and 15. A radial force is transmitted to rolling elements 3 designed as rollers as a result of race curvature 16 of segment 15 of bearing ring 6, said rollers in turn being supported on shaft 35 with a force-fit connection. Supplementary race curvature 16 included in the polygonal contour of bearing ring 6, proceeding from lateral skirts 17a, 17b and running toward rolling elements 3 guided in cage 19, results in an improved elasticity of roller bearing 2. In addition, it is possible to influence the elasticity by means of a variation in, and/or different, wall thicknesses S of bearing ring 6 at point of curvature 16 in the race. As a way of reducing the contact pressure between rolling elements 3 and bearing ring 6, race curvature 16 can include a flattened central region which enlarges contact zone 18.

Figure 4:
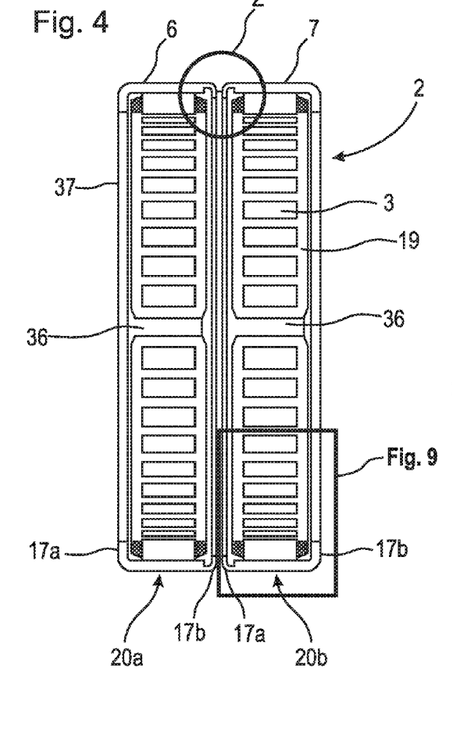
FIG. 4 shows a cutaway view of a two-row polygonal bearing as a roller bearing.
Figure 5:
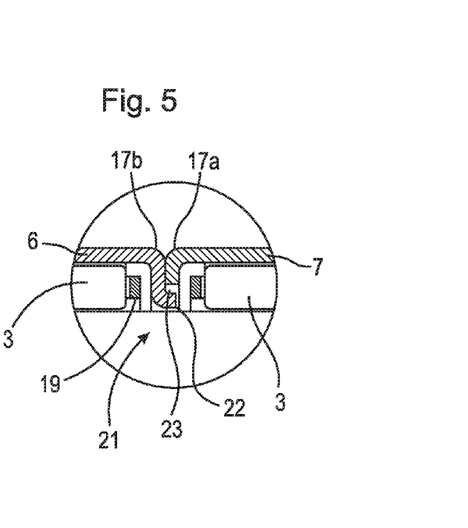
FIG. 5 shows the detail Z from FIG. 4 in an enlarged illustration.

FIG. 4 shows roller bearing 2 constructed as a two-row polygonal bearing, in a longitudinal cross-section. Two congruently constructed polygonal bearings 20a, 20b are supported axially via skirts 17a, 17b to form a structural unit intended for bearing configuration 1. A precise angularly offset position of outer bearing rings 6, 7 of polygonal bearings 20a, 20b is ensured by means of retainer 21 as illustrated in FIG. 5. Cages 19 of polygonal bearings 20a, 20b which include slot 36 can position and/or adjust themselves when assembled independently of each other. Each of outer skirts 17a, 17b of bearing rings 6, 7 have profiling 37 on the side which is oriented radially inward, in the shape of a crown. Via preferably semicircular profiling 37 with an open design, it is possible to achieve a greater throughput of lubricant of polygonal bearings 20a, 20b, improving the lubrication and cooling.

FIG. 5 shows an enlarged illustration of detail Z in FIG. 4, showing a positive-fitting connection of bearing rings 6, 7 of polygonal bearings 20a, 20b to form roller bearing 2. For this purpose, at least one axial extension 22 which is preferably connected to skirt 17b of bearing ring 6 as a single-piece, engages with play, in a positive-fitting manner, in notch 23 of adjacent skirt 17a of bearing ring 7, notch 23 corresponding thereto and preferably having a semicircular design. The engagement of extension 22 in this case is made <the component thickness of skirt 17b. Free movement of cages 19 inside bearing rings 6, 7 is preserved, independently of the positive-fit anchoring of bearing rings 6, 7.

Figure 6:
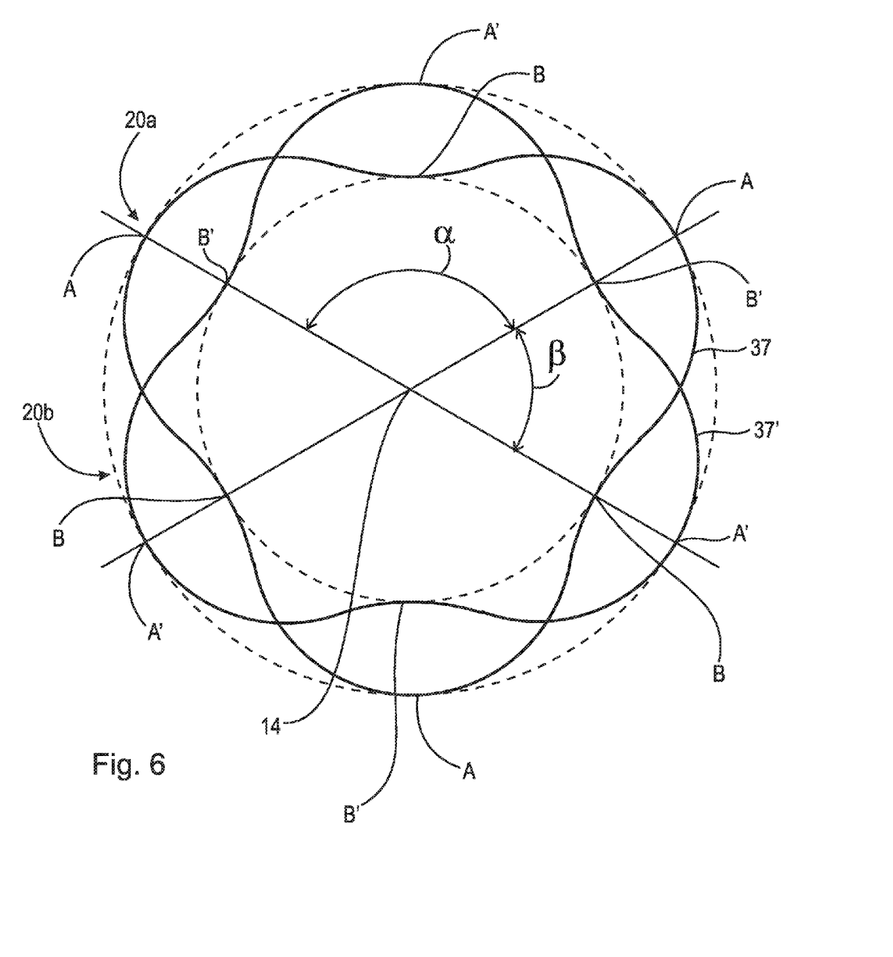
FIG. 6 shows a measurement path which clarifies the roundness of the polygonal bearing.

FIG. 6 shows a so-called roundness measurement path, a measurement for the purpose of determining the roundness of bearing rings 6, 7 of polygonal bearings 20a, 20b, the same fixed in their position with an angular offset of 60° to each other. Each polygonal bearing 20a, 20b forms—as shown in FIG. 1—three load release points (crest zones) offset by 120° (angle α) from each other and indicated by the letter A, and three load points (trough zones) offset by 120° from each other and indicated by the letter B. To clarify, profiling 37 of polygonal bearing 20a exhibits load release points A and load points B and profiling 37' of polygonal bearing 20b exhibits load release points A' and load points B'. As a result of the offset arrangement of polygonal bearings 20a, 20b, a halved angular offset of 60° exists between the load release points A and the load points B, which is alternately determined by polygonal bearings 20a, 20b.

Figure 7:
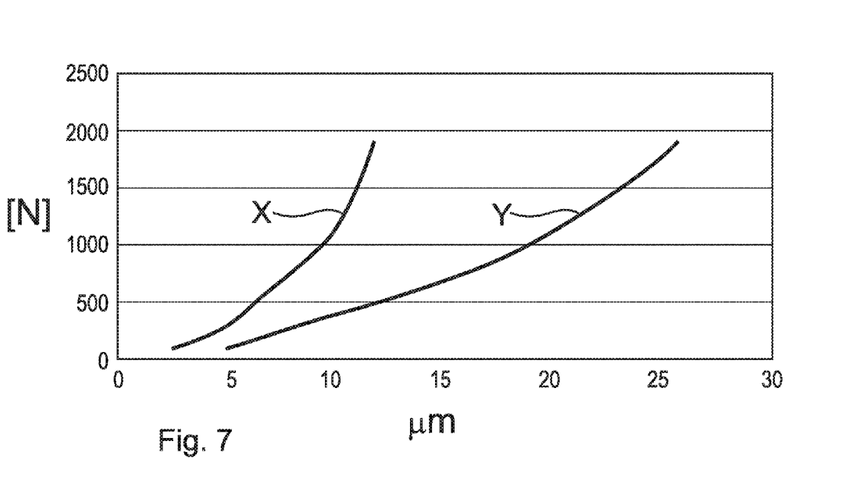
FIG. 7 shows a diagram illustrating a radial compression which depends on a radial force.

In FIG. 7, a radial compression on polygonal bearing 20a, 20b is illustrated according to a radial force applied to bearing configuration 1. Here, the radial force (N) is shown on the ordinate axis, and the compression distance (μm) is shown on the y-axis. The curve profile Y corresponds to the troughs (load points) which are indicated by the letter B in the roundness measurement path in FIG. 6. The further curve profile indicated by the letter X corresponds to the crest zones (load release points) which are indicated in FIG. 6 by the letter A. When the trough zones (curve profile Y) are loaded, a significantly greater compression occurs as a result of a lower spring resistance compared to the loading of the crest zones (curve profile X). The reduced compression in the crest zones (curve X) has a direct effect on the noise development of roller bearing 2. Taking this knowledge into account, roller bearing 2 has two polygonal bearings 20a, 20b which are deliberately fixed in their position relative to each other, with an angular offset, in such a manner that the peripheral load and load release points decrease, thereby creating a noise reduction.

Figure 8:
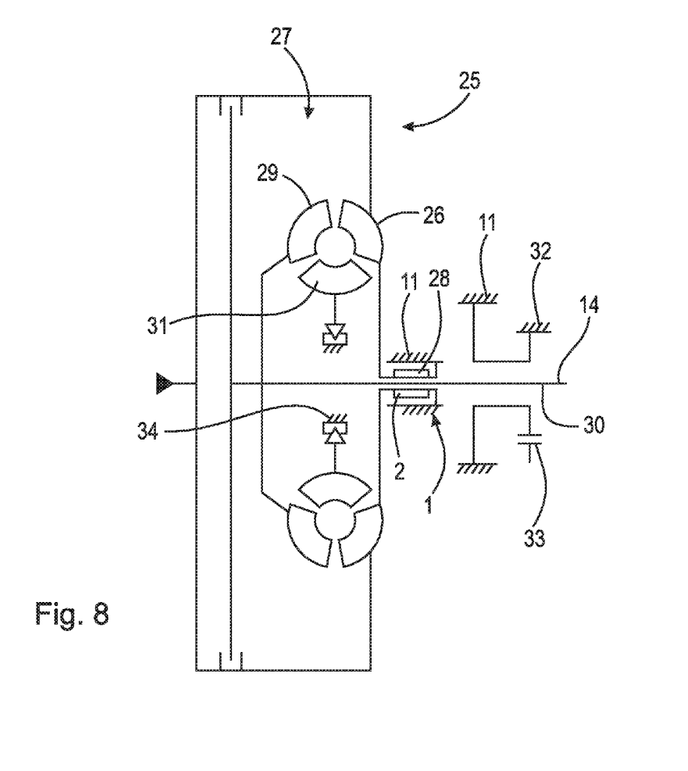
FIG. 8 schematically illustrates a gearing having a bearing configuration, wherein a pump wheel is mounted in a housing in a manner allowing rotation via said bearing configuration; and, FIG. 9 shows the outer contour of the bearing rings which produce a conicity.

Schematically simplified gearing 25 can be seen in FIG. 8, having bearing configuration 1 for the purpose of mounting pump wheel 26 in housing 11 in a manner allowing rotation. Pump wheel 26 of torque converter 27 is connected to converter neck 28 which is rotatably mounted via roller bearing 2 in housing 11. Housing 11 is, by way of example, a part of a primary pump which is not illustrated in greater detail, via which torque converter 27 and gearing 25 are supplied with pressure medium. The axis of rotation of pump wheel 26 is simultaneously axis of rotation 14 of turbine wheel 29, input gear shaft 30, and guide wheel 31. Turbine wheel 29 of torque converter 27 is connected to gearing 25, which itself is connected to torque converter 27, via input gear shaft 30, gearing 25 being symbolically illustrated by gears 32, 33. Guide wheel 31 of torque converter 27 which is concentric with axis of rotation 8 is supported via freewheel 34.

Figure 9:
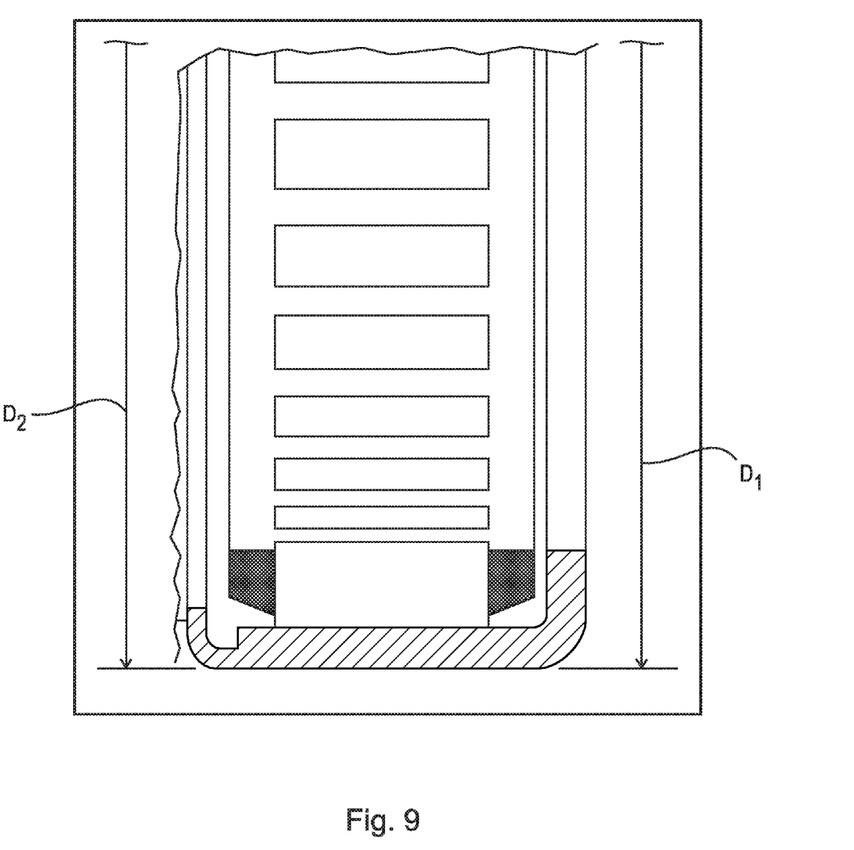

As illustrated in FIG. 9, the outer contour of the bearing rings has a conicity, wherein an outer diameter $D_2$ assigned to the flanged skirt is greater than an outer diameter $D_1$ on the fixed skirt. With this conicity, a jacket trace—a maximum circumscribed circle (shown in a dashed line in FIG. 6)—occurs at each of these outer diameters of the bearing ring. Between the jacket traces, the bearing ring defines a maximum inscribed circle (shown in a dashed line in FIG. 6).

LIST OF REFERENCE NUMBERS 1 bearing configuration
2 roller bearing
3 rolling element
4 annular gap
5 race (inner)
6 bearing ring (outer)
7 bearing ring (outer)
8 race (outer)
9 cage
10 bore hole
11 housing
12a segment
12b segment
13a position
13b position
14 axis of rotation
15 segment
16 race curvature
17a skirt
17b skirt
18 contact zone
19 cage
20a polygonal bearing
20b polygonal bearing
21 retainer
22 extension
23 notch
24 measurement path
25 gearing
26 pump
27 torque converter
28 converter neck
29 turbine
30 input gear shaft
31 guide wheel
32 gear
33 gear
34 freewheel
35 shaft
36 slot 37 profiling
37' profiling
A load release point
A' load release point
B load point
B' load point
H shell circle
I inner diameter
S wall thickness
$S_1$ radial play
$S_{max}$ radial play
X curvature profile (load release point)
Y curvature profile (load point)
Z detail
$α_1$ angle
$α_2$ angle
$β$ angle

What is claimed is:

1. A bearing configuration for the purpose of mounting a shaft or axle in a housing in a manner allowing rotation, the bearing configuration comprising:
a first polygonal bearing comprising:
an outer bearing ring which is functionally assigned to the housing, the outer bearing ring forming a first outer race facing inward radially, the outer bearing ring including an elastic segment oriented along an axis of rotation and forming a convex transversely rounded race curvature;
a second outer race facing outward radially of the shaft or of an inner bearing ring;
a plurality of rolling elements guidable on the first outer race and working together on an opposite side with the second outer race, the plurality of rolling elements including at least one rolling element arranged to be radially pretensioned and elastically supported on the first or second outer race with no radial play, via the elastic segment; and,
a first polygonal shape; and,
a second polygonal bearing joinable with the first polygonal bearing, the second polygonal bearing comprising a second polygonal shape which is the same as the first polygonal shape having a multi-cornered form and arranged with an angular offset relative to the first polygonal bearing when the polygonal bearings are correctly positioned.

2. The bearing configuration recited in claim 1, wherein the outer bearing ring of the first polygonal bearing has at least one segment with a radially elastic design, which runs around a periphery and which forms a longitudinal convexity.

3. The bearing configuration recited in claim 2, wherein a first wall thickness of the elastic segment and a second wall thickness of the at least one segment are different from other wall segments of the outer bearing ring.

4. The bearing configuration recited in claim 1, wherein the outer bearing ring forms a fixed skirt, an opposite flanged skirt, and a conicity of the outer bearing ring produces an outer diameter on the flanged skirt which exceeds an outer diameter on the fixed skirt.

5. The bearing configuration recited in claim 1, wherein the second polygonal bearing is fixed to the first polygonal bearing by means of a positive-fitting retainer.

6. The bearing configuration recited in claim 1, wherein:
a skirt of the outer bearing ring has a notch; and,
the second polygonal bearing includes a second outer bearing ring including an axial extension that engages in the notch with a positive fit;
wherein at least one skirt of the bearing configuration has a profiling on a radial inside thereof.

7. The bearing configuration recited in claim 1, wherein the outer bearing ring has a roundness deviation ≥0.2 mm prior to assembly, and a roundness deviation ≥0.025 mm when assembled, wherein a race straightness of a convex transversely rounded race curvature of the outer bearing ring prior to assembly is ≥0.015 mm, and wherein a value of ≥0.01 mm is reached at a load release point and a value of ≥0.02 mm is reached at the load point when assembled in a press-fit position.

8. A steering mount for a vehicle comprising the bearing configuration recited in claim 1.

9. A torque converter having a pump wheel connected to a converter neck mounted in a housing by means of the bearing configuration recited in claim 1.

10. A bearing configuration for the purpose of mounting a shaft or axle in a housing in a manner allowing rotation, the bearing configuration comprising:
a first polygonal bearing comprising:
an outer bearing ring which is functionally assigned to the housing, the outer bearing ring forming a first outer race facing inward radially, the outer bearing ring including:
an elastic segment oriented along an axis of rotation and forming a convex transversely rounded race curvature, the elastic segment including a first wall thickness;
at least one segment with a radially elastic design, which runs around a periphery and which forms a longitudinal convexity, the at least one segment including a second wall thickness; and,
the first and second wall thicknesses are different from other wall segments of the outer bearing ring;
a second outer race facing outward radially of the shaft or of an inner bearing ring; and,
a plurality of rolling elements guidable on the first outer race and working together on an opposite side with the second outer race, the plurality of rolling elements including at least one rolling element arranged to be radially pretensioned and elastically supported on the first or second outer race with no radial play, via the elastic segment; and,
a second polygonal bearing joinable with the first polygonal bearing.

* * * * *